Jan. 28, 1969 ZENJIRO ODA ET AL 3,424,936
METAL SLEEVE IONIZATION GAUGE HAVING CONTROLLED SPACING
BETWEEN GRID AND SHIELD ELECTRODES
FOR OPTIMIZATION OF SENSITIVITY
Filed Feb. 7, 1966

INVENTORS
ZENJIRO ODA
TADASHI SAKAI
BY
OSTROLENK, FABER, GERB & SOFFEN
ATTORNEYS

3,424,936
METAL SLEEVE IONIZATION GAUGE HAVING CONTROLLED SPACING BETWEEN GRID AND SHIELD ELECTRODES FOR OPTIMIZATION OF SENSITIVITY
Zenjiro Oda and Tadashi Sakai, Tokyo, Japan, assignors to Nippon Electric Company Limited, Tokyo, Japan
Filed Feb. 7, 1966, Ser. No. 525,602
Claims priority, application Japan, Feb. 10, 1965, 40/7,356
U.S. Cl. 313—240      3 Claims
Int. Cl. H01j 1/53

ABSTRACT OF THE DISCLOSURE

A metal sleeve ionization gauge in which the spacing between the shield and grid electrodes (which are preferably of cylindrical configuration) is controlled to within the range from 4 to 6½ millimeters for the purpose of optimizing sensitivity of the ionization gauge and reducing the voltage level required for successful operation of the gauge.

---

The instant invention relates to ionization gauges for measuring the degree of vacuum, and more particularly to improvements in ionization gauges employing metallic housings.

Conventional ionization gauges such as those typically referred to as the Nottingham ionization gauge have been typically employed for their superior sensitivity. Ionization gauges of this general type typically comprise a cathode for emitting electrons, a grid electrode maintained at a potential of the order of 100–200 volts for electron acceleration, and a collector electrode maintained at a potential of approximately −30 volts for collecting the ions produced by collison of the accelerated electrons with the residual gas in the substantially evacuated envelope, as well as a metal sleeve or shield electrode which is preferably of cylindrical shape and is aligned coaxial with the grid electrode. The metal sleeve or shield electrode is normally maintained at a potential of approximately −200 volts. This type of gauge is regarded as having nearly twice the sensitivity of the so called anode type ionization gauges which comprise only the above mentioned first three electrodes.

The Nottingham type ionization gauge, however, has been found to have defects with respect to both construction and usage. This type of gauge not only needs an electric voltage source for maintaining the shield electrode at the order of −200 volts, but also requires electrical insulation applied to the junction between shield electrode and the attached vacuum system when the shield electrode is employed as a part of the vacuum system. At present vacuum systems typically use metallic envelopes. The electrical insulating connection is not only quite expensive, but also introduces the danger of being highly susceptible to leakage. In addition, it is also quite desirable to provide a water cooling system for the ionization gauge to prevent any gas discharge due to a rise in temperature of the shield electrodes. With the use of such a water cooling system it is therefore most desirable to provide a shield electrode construction which is capable of being maintained at ground or zero potential for safety as well as other reasons.

The instant invention is characterized by providing a metal sleeve ionization gauge which does not require an electrical voltage source for the shield electrode and which provides superior sensitivity relative to conventional Nottingham type ionization gauges.

In accordance with the instant invention it is possible to provide a metallic sleeve ionization gauge which operates as an ionization gauge assembly which is comprised of a collector, a grid electrode which surrounds the collector coaxially, a shield electrode which surrounds the grid electrode coaxially, and a cathode disposed substantially along the longitudinal axis of the grid electrode and the shield electrode, and which is designed to employ the shield electrode at zero or ground potential by adjustment of the spacing between the grid and shield electrodes so as to be appreciably different from that of the conventional Nottingham ionization gauge assembly.

The objectives of the instant invention are successfully accomplished through the discovery of the fact that the same degree of sensitivity of conventional ionization gauges is obtainable by maintaining the shield electrode in very close proximity to the grid electrode, even when the potential of the shield electrode of a Nottingham type ionization gauge is maintained at zero potential.

Thus, when considering the condition in a typical vacuum type, wherein highest sensitivity is obtained by impressing a large negative potential upon the shield electrode, it can clearly be seen that a substantially zero potential location is found to exist in the potential distribution region between the grid and shield electrodes under such voltage distribution conditions, and accordingly, if a shield eletrode be located at this zero potential position, and be maintained at zero potential, then the potential distribution within the vacuum tube having such an arrangement will be substantially the same as the case when a negative large potential is impressed to a shield electrode located outside of the region of the conventional shield electrode. Hence it will be apparent that the sensitivity obtained through the arrangement of the instant invention is at least equal to the sensitivity of conventional Nottingham type ionization gauges.

It is therefore one object of the instant invention to provide a novel ionization gauge assembly exhibiting safety features not found in conventional type gauges.

Another object of the instant invention is to provide a novel ionization gauge assembly in which the positioning of the metallic shield electrode is so adjusted as to permit maintenance of the shield electrode at zero potential, thereby enhancing sensitivity and measurably increasing the safety factor provided by the device.

Another object of the instant invention is to provide a novel metallic sleeve ionization gauge assembly which does not require an electric voltage source for the shield electrode and which provides equivalent or better sensitivity when compared with conventional ionization gauges.

Another object of the instant invention is to provide a metallic sleeve ionization gauge assembly in which the shield electrode is so positioned as to permit its being maintained at zero potential so that no insulating connection is required between the metallic sleeve and an accompanying vacuum system in the case where the metallic sleeve of the ionization gauge is employed as part of the vacuum system.

A still further object of the instant invention is to provide a novel metallic sleeve ionization gauge assembly in which safe and effective water cooling of the metallic sleeve can be effected when the metallic sleeve is used as part of the vacuum system due to the novel assembly arrangement.

These and other objects of the instant invention will become apparent when reading the accompanying description and drawings in which.

Figure 1:
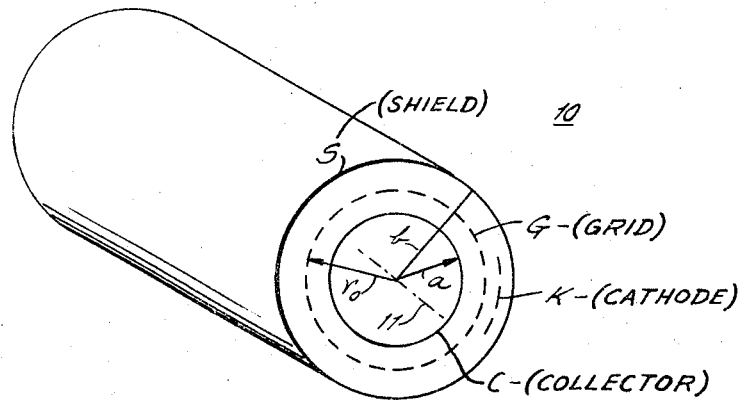
FIGURE 1 is a diagram showing the structure and arrangement of a metallic sleeve ionization gauge designed in accordance with the principles of the instant invention.

Referring now to the drawings; FIGURE 1 shows the arrangement 10 of an ionization gauge designed in accordance with the principles of the instant invention and which may be considered to be an end view of such an ionization gauge structure. The arrangement 10 of FIGURE 1 is comprised of a grid electrode G concentric with longitudinal axis 11 and having a radius $a$. A shield electrode S is arranged concentric with longitudinal axis 11 and has a radius $b$. In the conventional ionization gauge, if it is assumed that the maximum sensitivity is obtained when a radius of grid electrode G is $a$, the radius of shield electrode S is $b$, the grid electrode voltage is $V_g$ and the shield electrode voltage is $V_s$, then the position (radius) of zero potential within the gauge, i.e., the radius $R_0$ of the shield electrode with which the highest sensitivity is obtained by making the shield electrode potential equal to zero or ground can be obtained by the following equation:

$$1nr_0 = \frac{V_g 1nb - V_s 1na}{V_g - V_s} \quad (1)$$

As one example, the case where maximum sensitivity is attained where $a=11$ mm.; $b=21$ mm.; $V_g=180$ v. and $V_s=-190$ v. in a conventional ionization gauge assembly, this means that the highest sensitivity is attained when radius $R_0$ of the shield electrode is located at $R_0=15$ mm. This is true if the structural positions of all of the ionization gauge electrodes, with the exception of radius $b$ of the shield electrode, are retained in their original positions. That is, the space D ($D=R_0-a$) between the grid electrode and the shield electrode is to be set approximately at 4 mm.

However, in consideration of the fact that the cathode K (only a portion of which has been shown in FIG. 1) is normally located between the grid electrode G and the shield electrode S and also, that the degeneration of sensitivity is attended by reducing the space between the cathode and the grid electrode to a value below 4 mm., it becomes a practical impossiblity to realize the 4 mm. spacing which has been obtained by the calculation set forth above.

Figure 2:
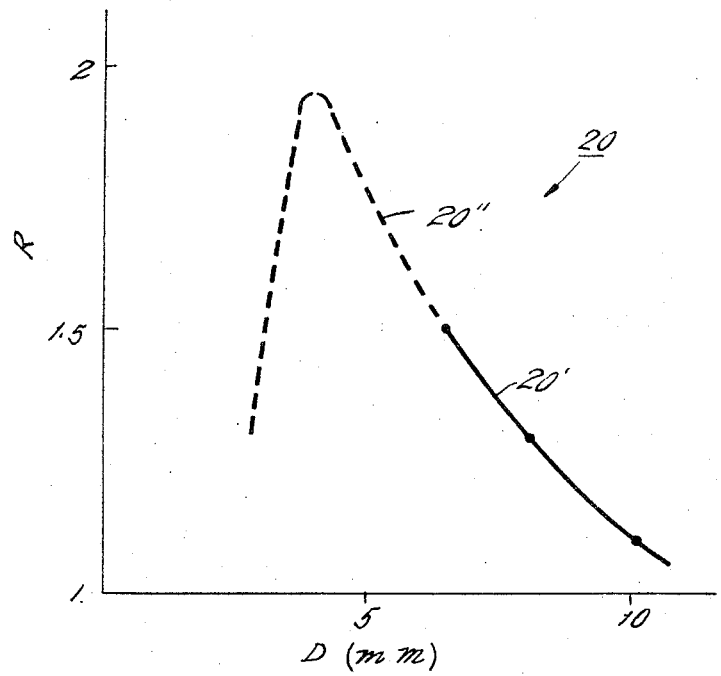
FIGURE 2 is a plot showing the variation of the sensitivity of the ionization gauge for changing position of the shield electrode while maintaining the shield electrode at zero or ground potential.

FIGURE 2 is a plot showing a curve 20 which relates the rate R of the variation of sensitivity in the case where the radius of the shield electrode S varied from the above mentioned ideal value by maintaining the potential of the shield electrode at zero potential, wherein the value of unity at zero potential (1) indicates an assembly which does not include a shield electrode.

The solid line portion 20′ of curve 20 indicates the experimental results, while the dotted line portion 20″ indicates the estimated values obtained by calculation.

When the space between the grid and shield electrodes G and S, respectively, approaches approximately 6.5 mm., this results in nearly a 23% decrease from the highest sensitivity but a sensitivity of approximately 1.5 times sensitivity of an assembly lacking a shield electrode is nevertheless maintained. Consequently, in the case of the above mentioned structure, the spacing between the two electrodes should be reduced as much as is practical. Although, it may be possible to obtain the highest sensitivity by setting the space D by an amount of the order of several mm., if the grid electrode radius $a$ is reduced, the volume of the ionization region will be reduced and results in a decrease in the absolute value of sensitivity and hence is not practically suited for use as such an ionization gauge assembly.

As can clearly be seen from the above descriptions, in accordance with the present invention, it is possible to provide a metallic sleeve ionization gauge which is capable of being employed with its shield electrode potential maintained at zero or ground voltage. Therefore, in accordance with the instant invention, an electrical source of energy of approximately 200 volts is no longer needed to maintain the shield electrode potential, and the insulating connection between the ionization gauge metal sleeve and the metallic vacuum system housing, which insulating connection is susceptible to gas leakage, is completely avoided in the case where the metallic sleeve is employed as part of the vacuum system. Thus it is possible, with the arrangement of the instant invention to permit a direct metallic connection to be made between the insulation gauge shield electrode and the vacuum system housing. Further, in the case where the metallic sleeve is employed as part of the vacuum system, it becomes convenient to water cool the metallic sleeve in order to avoid gas discharge due to rise in temperature of the metallic sleeve when in operation without any danger whatsoever of an electrical hazard.

While FIGURE 1 shows the grid electrode and shield electrode G and S, respectively, as being of circular configuration, the shapes of the electrode need not be so limited, and oval or square shapes will yield equally good results as will any regular polygonal shaped electrode number. It is even possible to explain the operation of the ionization gauge assembly having a non-circular shape by converting the configuration used into an equivalent circular shaped structure for the purpose of setting up and solving the equation for the structure.

Although there has been described herein a preferred embodiment of the instant invention, many variations and modifications will now be apparent to those skilled in the art. Therefore, this invention is to be limited, not by the specific disclosure herein, but only by the appending claims.

What is claimed is:

1. An ionization gauge assembly comprising a collector electrode disposed about an axial line;

a grid electrode substantially surrounding said collector electrode;

a shield electrode substantially surrounding said grid electrode;

a cathode electrode disposed between said shield electrode and grid electrode and substantially surrounding said grid electrode;

said shield electrode being positioned to lie substantially at a distance $r_0$ from said axial line where $r_0$ is given by the equation $$1nr_0 = \frac{V_g 1nb - V_s 1na}{V_g - V_s}$$

where $V_g$ is the electric potential applied to the grid electrode;

said distance $r_0$ being further chosen so that the spacing between grid and shield electrodes is in the range from 4 to 6.5 millimeters;

$V_s$ is the electric potential applied to the shield electrode when the shield electrode is arranged at the radius $b$ and the grid electrode is arranged at the radius a relative to said axial line;

means for maintaining said shield electrode at zero potential when positioned at substantially the radius $r_0$.

2. The assembly of claim 1 wherein said grid, cathode and shield electrodes are generally of annular shape.

3. The assembly of claim 1 wherein said grid, cathode and shield electrodes are substantially cylindrically shaped and are arranged in concentric fashion.

References Cited

UNITED STATES PATENTS

| | | | |
|---|---|---|---|
| 1,492,000 | 4/1924 | Round | 328—251 |
| 2,518,879 | 8/1950 | Germeshausen | 328—251 X |
| 2,993,137 | 7/1961 | Roehrig et al. | 313—7 |
| 3,353,055 | 11/1967 | Sibley | 313—7 X |

JOHN W. HUCKERT, *Primary Examiner.*

A. J. JAMES, *Assistant Examiner.*

U.S. Cl. X.R.

313—7, 93, 214, 305; 328—251